Figures 1, 2:
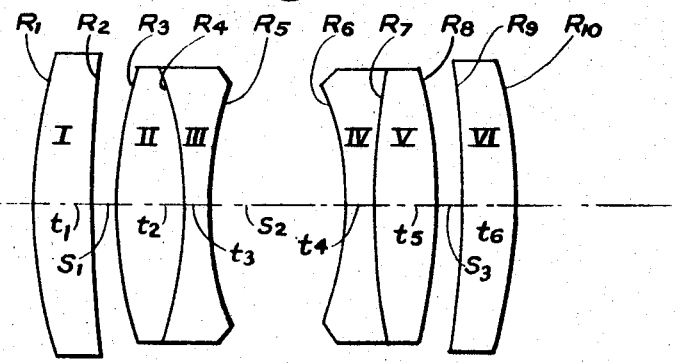

May 16, 1967     W. E. SCHADE     3,320,017

PROJECTION PRINTER LENS

Filed March 26, 1963

| F = 100 | | | | f/4.5 |
|---|---|---|---|---|
| LENS | $N_D$ | V | RADII | THICKNESSES |
| I | 1.745 | 45.8 | $R_1 = +35.6$ mm. <br> $R_2 = -110.0$ | $t_1 = 4.5$ mm. <br> $S_1 = 1.7$ |
| II <br> III | 1.573 <br> 1.573 | 56.8 <br> 42.5 | $R_3 = +43.1$ <br> $R_4 = -33.7$ <br> $R_5 = +22.7$ | $t_2 = 4.9$ <br> $t_3 = 1.9$ <br> $S_2 = 10.2$ |
| IV <br> V | 1.573 <br> 1.573 | 42.5 <br> 56.8 | $R_6 = -22.3$ <br> $R_7 = +63.0$ <br> $R_8 = -37.6$ | $t_4 = 1.9$ <br> $t_5 = 4.7$ <br> $S_3 = 1.7$ |
| VI | 1.745 | 45.8 | $R_9 = -116.8$ <br> $R_{10} = -33.4$ | $t_6 = 4.3$ <br> BF = 31.0 |

Willy E. Schade
INVENTOR.

BY R. Frank Smith
T. M. Emerson Holmy
ATTORNEYS

United States Patent Office 3,320,017
Patented May 16, 1967

3,320,017
PROJECTION PRINTER LENS
Willy E. Schade, Rochester, N.Y., assignor to Eastman Kodak Company, Rochester, N.Y., a corporation of New Jersey
Filed Mar. 26, 1963, Ser. No. 268,012
3 Claims. (Cl. 350—222)

This invention relates to photographic objectives, particularly to highly corrected objectives to be used for enlarging or projection printing, i.e., to be used at finite conjugates.

Furthermore, the lens according to the present invention is of a well-known type comprising two compound lenses between two positive components. The simplest form of such lens consists of two doublets airspaced between two positive elements.

The object of the present invention is to provide a fairly high aperture lens, up to $f/4.5$ covering a relatively wide field and with low distortion, low lateral color, low coma, and low rim ray discrepancy. That is, the object of the invention is to provide a lens with high resolution out to the edges of a wide flat field.

The basic six-element lens of this general type has ten optical surfaces which are spherical or plano, surfaces 4 and 7 being cemented. The present invention can be described with reference to the curvatures of the surfaces. The outer components, namely elements 1 and 6, are preferably of high index of refraction, and the other four elements are preferably of average index of refraction between 1.55 and 1.60. The elements adjacent to the central airspace are negative elements with a dispersive index V between 40 and 45, which is somewhat larger V value than is normally used in this type of lens.

There is nothing unusual about the axial thicknesses of the elements and the spacings thereof, but to obtain the high correction mentioned above, they must be held within certain limits. Also the front surface of the front doublet and the rear surface of the rear doublet have radii of curvatures similar to most lenses of this type. The distinctive features of the present lens lie primarily in the curvatures of the surfaces of the outer components and in the curvature of the cemented surfaces and surfaces adjacent to the central airspace.

The high degree of correction is obtained according to the present invention when the values of the index of refraction $N_D$, the dispersive index V, the surface radii R, the thicknesses $t$ and the spacings $s$ have values within the following ranges, the elements and surfaces being numbered from the long conjugate side herein referred to as the front, and + and − radii referring respectively to surfaces convex and concave to the front. F is the focal length of the lens. The lens when used in projection printing normally works from a magnification of 1:1 (in which case the conjugates are equal) up to a magnification of 5:1, 10:1, or even larger, in which case there is definitely a long conjugate and a short conjugate side. This does not mean that the lens cannot be focused down to give satisfactory prints at slightly less than 1:1, but the term "long conjugate side" or "front" refers to the direction in which the long conjugate side of the lens is facing when it is used at say 6:1 magnification.

| Element | $N_D$ | V |
|---|---|---|
| I | 1.72 to 1.78 | 44 to 48 |
| II | 1.55 to 1.60 | 56 to 59 |
| III | 1.55 to 1.60 | 40 to 45 |
| IV | 1.55 to 1.60 | 40 to 45 |
| V | 1.55 to 1.60 | 56 to 59 |
| VI | 1.72 to 1.78 | 44 to 48 |

$R_1 = +.3F$ to $+.5F$         $t_1 = .03F$ to $.07F$
$R_2 = +1.0F$ to $+2.0F$       $s_1 = .01F$ to $.03F$
$R_3 = +.3F$ to $+.5F$         $t_2 = .03F$ to $.07F$
$R_4 = -.3F$ to $-.5F$         $t_3 = .01F$ to $.03F$
$R_5 = +.20F$ to $+.25F$       $s_2 = .04F$ to $.20F$
$R_6 + -.20F$ to $+.25F$       $t_4 = .01F$ to $.03F$
$R_7 = +.3F$ to $+F$           $t_5 = .03F$ to $.07F$
$R_8 + -.3F$ to $-.5F$         $s_3 = .01F$ to $.03F$
$R_9 + - F$ to $-2.0F$         $t_6 = .03F$ to $.07F$
$R_{10} + -.3F$ to $-.5F$

It will be noted that the ranges for $R_1$, $R_4$, $R_5$, $R_6$ and $R_{10}$ are somewhat restricted compared to the ranges for $R_2$, $R_7$ and $R_9$.

In the accompanying drawing:

FIG. 1 illustrates a cross section of a preferred embodiment of the invention.

FIG. 2 gives the specification for that embodiment which corresponds to Example 3 below.

Three examples of preferred embodiments of the invention are as follows:

Example 1

The following is the specification of a lens designed to operate with high resolution at magnifications from 1:1 to 6:1.

F=100 mm. f/4.5

| Lens | $N_D$ | V | Radii, mm. | Thicknesses, mm. |
|---|---|---|---|---|
| I | 1.745 | 45.6 | $R_1 = +38.2$ | $t_1 = 4.5$ |
|   |       |      | $R_2 = +141.4$ | $s_1 = 1.8$ |
| II | 1.573 | 56.8 | $R_3 = +45.0$ | $t_2 = 4.9$ |
| III | 1.573 | 42.5 | $R_4 = -41.3$ | $t_3 = 1.9$ |
|   |       |      | $R_5 = +23.4$ | $s_2 = 6.4$ |
| IV | 1.573 | 42.5 | $R_6 = -23.4$ | $t_4 = 1.9$ |
| V | 1.573 | 56.8 | $R_7 = +41.3$ | $t_5 = 4.9$ |
|   |       |      | $R_8 = -45.0$ | $s_3 = 1.8$ |
| VI | 1.745 | 45.6 | $R_9 = -141.4$ | $t_6 = 4.5$ |
|   |       |      | $R_{10} = -38.2$ | BF=84.7 |

Example 2

The following is the specification of a lens also designed to operate at a magnification of 1:1 to 6:1 with somewhat better correction for rim rays than Example 1.

F=100 mm. f/4.5

| Lens | $N_D$ | V | Radii, mm. | Thicknesses, mm. |
|---|---|---|---|---|
| I | 1.745 | 45.8 | $R_1 = +35.7$ | $t_1 = 4.6$ |
|   |       |      | $R_2 = +110.0$ | $s_1 = 1.7$ |
| II | 1.573 | 56.8 | $R_3 = +43.0$ | $t_2 = 4.8$ |
| III | 1.573 | 42.5 | $R_4 = -33.7$ | $t_3 = 1.9$ |
|   |       |      | $R_5 = +22.6$ | $s_2 = 10.2$ |
| IV | 1.573 | 42.5 | $R_6 = -22.6$ | $t_4 = 1.9$ |
| V | 1.573 | 56.8 | $R_7 = +61.0$ | $t_5 = 4.7$ |
|   |       |      | $R_8 = -38.3$ | $s_3 = 1.7$ |
| VI | 1.745 | 45.8 | $R_9 = -124.2$ | $t_6 = 4.3$ |
|   |       |      | $R_{10} = -39.1$ | BF=80.7 |

Example 3

The following is the specification for a lens intended to operate at magnifications from 1:1 to 8.5:1. This lens has even better correction for rim ray than Example 2 above.

$F = 100$ mm. $f/4.5$

| Lens | $N_D$ | V | Radii, mm. | Thicknesses, mm. |
|---|---|---|---|---|
| I | 1.745 | 45.8 | $R_1 = +35.7$ | $t_1 = 4.5$ |
|  |  |  | $R_2 = +110.0$ | $s_1 = 1.7$ |
| II | 1.573 | 56.8 | $R_3 = +43.1$ | $t_2 = 4.9$ |
| III | 1.573 | 42.5 | $R_4 = -33.7$ | $t_3 = 1.9$ |
|  |  |  | $R_5 = +22.7$ | $s_2 = 10.2$ |
| IV | 1.573 | 42.5 | $R_6 = -22.3$ | $t_4 = 1.9$ |
| V | 1.573 | 56.8 | $R_7 = +63.0$ | $t_5 = 4.7$ |
|  |  |  | $R_8 = -37.6$ | $s_3 = 1.7$ |
| VI | 1.745 | 45.8 | $R_9 = -116.8$ | $t_6 = 4.3$ |
|  |  |  | $R_{10} = -33.4$ | $BF = 81.0$ |

I claim:
1. A lens having substantially the following specifications, where $N_D$ is the index of refraction and V is the dispersive index of the elements, R is the radius of curvature of the surfaces, $t$ is the axial thickness and $s$ is the spacing of the elements all numbered by subscripts from front to rear and F is the focal length of the lens:

| Lens | $N_D$ | V | Radii | Thicknesses |
|---|---|---|---|---|
| I | 1.75 | 46 | $R_1 = +.38\ F$ | $t_1 = .05\ F$ |
|  |  |  | $R_2 = +1.41\ F$ | $s_1 = .02\ F$ |
| II | 1.57 | 57 | $R_3 = +.45\ F$ | $t_2 = .05\ F$ |
| III | 1.57 | 43 | $R_4 = -.41\ F$ | $t_3 = .02\ F$ |
|  |  |  | $R_5 = +.23\ F$ | $s_2 = .06\ F$ |
| IV | 1.57 | 43 | $R_6 = -.23\ F$ | $t_4 = .02\ F$ |
| V | 1.57 | 57 | $R_7 = +.41\ F$ | $t_5 = .05\ F$ |
|  |  |  | $R_8 = -.45\ F$ | $s_3 = .02\ F$ |
| VI | 1.75 | 46 | $R_9 = -1.41\ F$ | $t_6 = .05\ F$ |
|  |  |  | $R_{10} = -.38\ F$ |  |

2. A lens having substantially the following specifications, where $N_D$ is the index of refraction and V is the dispersive index of the elements, R is the radius of curvature of the surfaces, $t$ is the axial thickness and $s$ is the spacing of the elements all numbered by subscripts from front to rear and F is the focal length of the lens:

| Lens | $N_D$ | V | Radii | Thicknesses |
|---|---|---|---|---|
| I | 1.75 | 46 | $R_1 = +.36\ F$ | $t_1 = .05\ F$ |
|  |  |  | $R_2 = +1.10\ F$ | $s_1 = .02\ F$ |
| II | 1.57 | 57 | $R_3 = +.43\ F$ | $t_2 = .05\ F$ |
| III | 1.57 | 43 | $R_4 = -.34\ F$ | $t_3 = .02\ F$ |
|  |  |  | $R_5 = +.23\ F$ | $s_2 = .10\ F$ |
| IV | 1.57 | 43 | $R_6 = -.23\ F$ | $t_4 = .02\ F$ |
| V | 1.57 | 57 | $R_7 = +.61\ F$ | $t_5 = .05\ F$ |
|  |  |  | $R_8 = -.38\ F$ | $s_3 = .02\ F$ |
| VI | 1.75 | 46 | $R_9 = -1.24\ F$ | $t_6 = .04\ F$ |
|  |  |  | $R_{10} = -.39\ F$ |  |

3. A lens having substantially the following specifications, where $N_D$ is the index of refraction and V is the dispersive index of the elements, R is the radius of curvature of the surfaces, $t$ is the axial thickness and $s$ is the spacing of the elements all numbered by subscripts from front to rear and F is the focal length of the lens:

| Lens | $N_D$ | V | Radii | Thicknesses |
|---|---|---|---|---|
| I | 1.75 | 46 | $R_1 = +.36\ F$ | $t_1 = .05\ F$ |
|  |  |  | $R_2 = +1.10\ F$ | $s_1 = .02\ F$ |
| II | 1.57 | 57 | $R_3 = +.43\ F$ | $t_2 = .05\ F$ |
| III | 1.57 | 43 | $R_4 = -.34\ F$ | $t_3 = .02\ F$ |
|  |  |  | $R_5 = +.23\ F$ | $s_2 = .10\ F$ |
| IV | 1.57 | 43 | $R_6 = -.22\ F$ | $t_4 = .02\ F$ |
| V | 1.57 | 57 | $R_7 = +.63\ F$ | $t_5 = .05\ F$ |
|  |  |  | $R_8 = -.38\ F$ | $s_3 = .02\ F$ |
| VI | 1.75 | 46 | $R_9 = -1.17\ F$ | $t_6 = .04\ F$ |
|  |  |  | $R_{10} = -.33\ F$ |  |

No references cited.

JEWELL H. PEDERSEN, *Primary Examiner.*

JOHN K. CORBIN, *Examiner.*

R. J. STERN, *Assistant Examiner.*